Patented June 27, 1950

2,512,601

UNITED STATES PATENT OFFICE 2,512,601

PRODUCTION OF LINEAR NITROGEN-CONTAINING POLYMERIC MATERIALS

Harold Bates, James Wotherspoon Fisher, and Edward William Wheatley, Spondon, near Derby, England, assignors to Celanese Corporation of America, a corporation of Delaware No Drawing. Application December 13, 1949, Serial No. 132,806. In Great Britain May 10, 1945

6 Claims. (Cl. 260—78.4)

This invention relates to improvements in the production of linear nitrogen-containing polymeric materials and is more particularly concerned with the production of polymers suitable for the formation of filaments, films and plastic materials. The application is a continuation-in-part of our application S. No. 662,628 filed April 16, 1946.

The polymers appear to be poly-4-amino-1.2.4-triazoles. According to the invention, they are produced by heating a dicarboxylic acid or an anhydride of a dicarboxylic acid with hydrazine, the proportion of hydrazine being rather more than two moles of hydrazine for each mole of dicarboxylic acid. Generally it is preferred to have an excess of hydrazine amounting to 10% of the combined weight of the dicarboxylic acid and the two moles of hydrazine theoretically necessary. It is generally found that the use of an excess in no way limits the molecular weight attainable in the polymer. Some of the hydrazine may be present in the reaction mixture as the salt of hydrazine with the dicarboxylic acid, for example hydrazine sebacate.

The polymers produced are very resistant to hydrolysis either by alkali or acid, for example hydrochloric acid, and hence show little or no tendency to depolymerisation. Many of them have melting points which make them suitable for the production of filaments for use in textile materials, that is to say they have melting points above the usual ironing temperatures.

The dicarboxylic acids may be those in which the two carboxylic groups are the sole substituent radicles in a hydrocarbon chain, for example succinic acid, glutaric acid, adipic acid, pimelic acid, suberic acid, azelaic acid, sebacic acid and the higher dicarboxylic acids of this series, diphenic acid, phenylene 1.4-diacetic acid and similar dicarboxylic acids of the aromatic series. In the above-mentioned aliphatic dicarboxylic acids, it is preferred to use polymethylene dicarboxylic acids, i. e. acids of the general formula $HOOC(CH_2)_nCOOH$, where $n$ is more than 4, i. e. acids from pimelic acid upwards. The invention also includes the use of dicarboxylic acids containing substituents or hetero atoms which do not interfere with the reaction, for example diglycollic acid, N-methyl-imino-diacetic acid, thiodivaleric acid $HOOC(CH_2)_4.S.(CH_2)_4COOH$, and similar dicarboxylic acids containing unreactive atoms in the chain.

The condensation may be carried out by simple heating. Usually temperatures of the order of 200–300° C., and especially 230–280° C., are suitable for the purpose. Heating may be carried out on the undiluted reagents or the reagents may be suspended or dissolved in a suitable diluent. The presence of water during the condensation is very beneficial, at least in the initial stages, since it appears to prevent or retard a tendency for the polymer to become resinous or soluble, possibly by cross-linking or some other side reaction. This water may be added in the form of hydrazine hydrate or an aqueous solution of hydrazine hydrate. The condensation is preferably carried out, at least in the initial stages, in a closed vessel, though in the later stages the pressure that builds up may be wholly or in part released, and, further, towards the end of the condensation the pressure may be reduced to below atmospheric pressure. This final reduction of pressure to below atmospheric pressure is not, however, necessary, and the whole condensation may be carried out in a closed vessel with or without periodic or continuous release of pressure, for example release of pressure down to 300 lbs. per square inch.

The minimum proportion of hydrazine necessary to produce polymers resistant to hydrochloric acid varies somewhat with the temperature at which the condensation is carried out. For example, with sebacic acid and a condensation temperature of 190° C., 2.17 moles of hydrazine for each mole of acid generally suffice, while at 210° C. 2.21 moles of hydrazine appear to be necessary and at 230° C. 2.33 moles. Probably there are other factors which determine the minimum proportion of hydrazine necessary, but simple trial is sufficient to ascertain such a minimum proportion. Generally it is advisable to use more than the minimum, for example the 10% excess of hydrazine (calculated on the weight of the dicarboxylic acid plus two moles of hydrazine) referred to above.

While the invention includes the production of polymers of relatively low molecular weight, it is mainly addressed to the production of polymers which have film- and filament-forming properties. It is found that the ability to form filaments usually sets in when an intrinsic viscosity of 0.3–0.4 is reached, as measured in a 1% solution of the polymer in meta-cresol. For the best filaments the condensation is best carried to an intrinsic viscosity of at least 0.5–0.6, at which stage filaments made from the polymers usually exhibit cold-drawing properties, with consequent increase in their tensile strength measured in grams per denier.

As indicated above, the polymers are extremely stable to hydrolysing agencies and hence there is very little tendency for their viscosity to decrease. Some of them probably contain terminal hydrazide groups which are capable of further condensation. Such a tendency to further condensation may be eliminated, or in other words the chain length of the polymer may be stabilised, by hydrolysing these terminal hydrazide groups. For example the polymer may be heated with an aqueous solution of hydrochloric acid or any other suitable mineral acid to split off the hydrazine at the ends of the chains and thus constitute carboxylic acid groups as the terminal groups. The polymer is then obtained in the form of a hydrochloride or similar salt, and the base may be recovered therefrom by suitable neutralisation of the acid. The polymer then appears to be stable against increase in chain length.

The invention includes the production of filaments, films and other articles from the polymers produced as described above. The filaments may be produced by melt spinning, i. e. by extruding a melt of the polymer through suitable orifices. In general the temperature of the polymer to be extruded should be some 10-30° above the melting point of the polymer. This melting temperature may be modified to some extent, e. g. with a view to reducing any tendency to decomposition during spinning at very high temperatures, by mixing the polymer with suitable proportions of plasticisers, for example sulfonamide plasticisers, phenolic plasticisers, urea and thiourea plasticisers and the like. Such plasticisers may either be left in the products or may be partially or completely extracted therefrom. Filaments may also be produced by wet or dry spinning methods from solutions in suitable solvents, for example formic acid or acetic acid or phenolic solvents.

The filaments so formed may, if the polymer be of sufficiently high molecular weight, be drawn out at comparatively low temperatures, or even at atmospheric temperature, to very fine filaments having high tenacity and good elasticity. The resulting filaments may then be used for any of the purposes to which artificial silks have in the past been applied. Generally the products have an affinity for the dispersed insoluble type of dyestuff now generally applied to cellulose acetate. They also exhibit an affinity for the acid wool colours.

While the invention is especially directed to the manufacture and application of fibre-forming polymers, it is not limited thereto and embraces the production of similar polymers suitable, for example, for use as softening agents, coatings, film-forming substances, and the like. Moreover, for these applications the polymers of the present invention may be mixed with other fibre-forming, film-forming or lacquer substances or other ingredients, for example cellulose acetate, aceto-butyrate, butyrate and acetostearate, ethyl cellulose, oxyethyl cellulose, oxyethyl cellulose acetate, benzyl cellulose and other cellulose derivatives, plasticizers or softening agents, dyestuffs, pigments and the like.

The following examples illustrate the invention but are not to be considered as limiting it.

Example 1

100 parts by weight of hydrazine sebacate and 60 parts by weight of 50% aqueous hydrazine hydrate were heated for 2 hours at 260° C. in an autoclave. The heating was then continued for a further 2 hours at 260° C. while limiting the pressure by release to about 250 lbs. The product had a melting point of about 250° C. and an intrinsic viscosity of 0.51, and was readily capable of yielding filaments from the melt which could be cold-drawn.

Example 2

A dope was prepared by dissolving 450 gms. of the polymer prepared according to Example 1 above in 100 parts of orthophenyl phenol and 200 parts of meta-cresol under nitrogen. The cresol was then allowed to boil off. The product cooled to a hard mass. The mixture was then introduced into a melt spinning crucible fitted just in front of the spinneret with a filter screen of one layer of 150 mesh Phosphor bronze gauze and two layers of 300 mesh Phosphor bronze gauze. The spinneret had a diameter of 0.2 mm. The spinning crucible was heated by an electrically heated lead bath to a temperature of 250° C. A nitrogen pressure of 300 lbs. per square inch was applied and the extruded filaments wound up on a cheese former. The product had an extremely high lustre and exhibited good cold-drawing properties.

Example 3

100 parts by weight of sebacic acid and 110 parts by weight of 50% aqueous hydrazine hydrate were heated together in an autoclave for 2 hours at 260° C. and then for a further 2 hours at the same temperature while releasing the pressure to 500 lbs. per square inch. The product had an intrinsic viscosity of 0.36 and yielded long filaments from the melt.

Example 4

100 parts by weight of sebacic acid and 60 parts by weight of 60% aqueous hydrazine were heated in an autoclave for 14 hours at 220° C. without release of pressure. The maximum pressure recorded was 675 lbs. per square inch. The polymer was formed as a massive white cake which was pulverised and dried. It had properties similar to those produced in Examples 1 and 3, including a melting point of 256-257° C. and an intrinsic viscosity of 0.58.

Example 5

100 parts by weight of sebacic acid were heated in an autoclave with 75 parts by weight of 60% aqueous hydrazine under the following temperature and pressure conditions, the autoclave remaining closed throughout:

(a) At 140° C. for 2 hours. Pressure recorded 120 lbs. per square inch.
(b) At 210° C. for 6 hours. Pressure recorded 250 lbs. per square inch.
(c) At 230° C. for 14 hours. Pressure recorded 600 lbs. per square inch.

The product was a white solid with fibre-forming properties, a melting point of 264° C. and an intrinsic viscosity of 0.57. Its nitrogen content was 28.0%.

All the above polymers from sebacic acid were insoluble in water, methanol, chloroform, acetone and benzene, and soluble in cresol and in formic acid.

Example 6

117 parts by weight of thiodivaleric acid $HOOC.(CH_2)_4.S.(CH_2)_4.COOH$ and 96 parts by weight of 60% aqueous hydrazine were heated in an autoclave for 2 hours at 140° C., 1 hour at 200° C. and then 1½ hours at 220° C. The product was a white solid of melting point 150-155°

C., capable of forming long fine filaments. It was insoluble in water, acetone, chloroform and benzene, slightly soluble in methanol and soluble in cresol and in formic acid. Its sulphur content was 14.0%.

Example 7

100 parts by weight of adipic acid and 80 parts by weight of 60% hydrazine were heated in an autoclave first at 150° C. for 2 hours, then at 210° C. for 5 hours, and finally at 230° C. for 15 hours. The product had a melting point of 264° C. and an intrinsic viscosity of 0.56. It was insoluble in cold water but slowly soluble in hot water, insoluble in acetone and benzene, and soluble in cresol and in formic acid.

Example 8

20 parts by weight of pimelic acid and 20 parts by weight of 60% aqueous hydrazine were heated in an autoclave for 5 hours at 230° C. At the end of this treatment, during which the pressure reached 1000 lbs. per square inch, the pressure was released down to 500 lbs. per square inch and the polymer heated for another hour at 230° C. The melting point of the polymer was 258° C. and its intrinsic viscosity 0.43. It was insoluble in acetone and benzene and soluble in cresol and in formic acid.

Example 9

To 50 parts by weight of monomeric adipic anhydride 30% aqueous hydrazine was slowly added. A vigorous reaction took place and when the amount of hydrazine added was rather more than half a mole for each mole of initial adipic anhydride a somewhat yellowish solid separated out. This solid was isolated and washed first with 1.4-dioxane and then with cold water. By this means the yellowish colouration was removed and the resulting product was almost pure white. 44 parts of this washed solid and 60 parts of 40% aqueous hydrazine were then heated in a closed autoclave for 3 hours at 210° C. without release of pressure. The maximum pressure recorded was 280 lbs. per square inch. The product was a granular solid, slightly off white, and had a melting point of 275° C. Its solubility properties were the same as those of the polymer produced in Example 7 above. Its nitrogen content was 35.4%.

Having described our invention, what we desire to secure by Letters Patent is:

1. Process for the production of a nitrogen-containing polymer, which comprises heating a reaction mixture containing a dicarboxylic reagent selected from the group consisting of dicarboxylic acids, free from reactive groups other than the carboxy groups, and their anhydrides, and containing hydrazine, the total amount of hydrazine in the reaction mixture being more than two moles for each mole of dicarboxylic acid and being sufficient to produce a polymer resistant to hydrochloric acid, and continuing the heating until the polymer is produced.

2. Process for the production of a nitrogen-containing polymer, which comprises heating a reaction mixture containing a dicarboxylic reagent selected from the group consisting of dicarboxylic acids, free from reactive groups other than the carboxy groups, and their anhydrides, and containing hydrazine, the total amount of hydrazine in the reaction mixture being more than two moles for each mole of dicarboxylic acid and being sufficient to produce a polymer resistant to hydrochloric acid, and continuing the heating until the polymer has fibre-forming properties.

3. Process for the production of a nitrogen-containing polymer, which comprises heating a reaction mixture containing a dicarboxylic reagent selected from the group consisting of dicarboxylic acids, free from reactive groups other than the carboxy groups, and their anhydrides, and containing hydrazine and water, the total amount of hydrazine in the reaction mixture being more than two moles for each mole of dicarboxylic acid and being sufficient to produce a polymer resistant to hydrochloric acid, and continuing the heating until the polymer is produced.

4. Process for the production of a nitrogen-containing polymer, which comprises heating a reaction mixture containing a dicarboxylic acid of the formula $HOOC(CH_2)_nCOOH$, where $n$ is an integer more than 4, with hydrazine and water, the total amount of hydrazine being more than two moles for each mole of dicarboxylic acid and being sufficient to produce a polymer resistant to hydrochloric acid, and continuing the heating until the polymer is produced.

5. Process for the production of a nitrogen-containing polymer, which comprises heating a reaction mixture containing a dicarboxylic acid of the formula $HOOC(CH_2)_nCOOH$, where $n$ is an integer more than 4, with hydrazine and water, the total amount of hydrazine being more than two moles for each mole of dicarboxylic acid and being sufficient to produce a polymer resistant to hydrochloric acid, and continuing the heating until the polymer has fibre-forming properties.

6. Process for the production of a nitrogen-containing polymer, which comprises heating a reaction mixture containing sebacic acid with hydrazine and water, the total amount of hydrazine being more than two moles for each mole of sebacic acid and being sufficient to produce a polymer resistant to hydrochloric acid, and continuing the heating until the polymer has fibre-forming properties.

HAROLD BATES.
JAMES WOTHERSPOON FISHER.
EDWARD WILLIAM WHEATLEY.

No references cited.